United States Patent
Chang

(10) Patent No.: US 11,283,966 B1
(45) Date of Patent: Mar. 22, 2022

(54) METHODS AND SYSTEMS FOR DYNAMIC SHARING OF ICC PROFILES

(71) Applicant: KYOCERA DOCUMENT SOLUTIONS INC., Osaka (JP)

(72) Inventor: Michael M. Chang, El Segundo, CA (US)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 17/002,470

(22) Filed: Aug. 25, 2020

(51) Int. Cl.
*H04N 1/60* (2006.01)

(52) U.S. Cl.
CPC .......... *H04N 1/603* (2013.01); *H04N 1/6008* (2013.01); *H04N 1/6058* (2013.01); *H04N 1/6072* (2013.01); *H04N 2201/3256* (2013.01)

(58) Field of Classification Search
CPC combination set(s) only.
See application file for complete search history.

(56) References Cited

U.S. PATENT DOCUMENTS

| | | | |
|---|---|---|---|
| 7,417,769 B2 | 8/2008 | Hasler et al. | |
| 8,995,010 B2 | 3/2015 | Senn et al. | |
| 2012/0188596 A1* | 7/2012 | Niles | G06F 3/1229 |
| | | | 358/1.15 |

FOREIGN PATENT DOCUMENTS

JP    2017049424 A  *  3/2017  ........... H04N 1/2353

* cited by examiner

*Primary Examiner* — Barbara D Reinier
(74) *Attorney, Agent, or Firm* — GrowIP Law Group LLC

(57) ABSTRACT

Example embodiments relate to dynamic sharing of ICC profiles. A computing device may receive data representing a paper type, a customer precision requirement, and supporting parameters and perform a search of a paper catalog using the data for an existing ICC profile that satisfies the customer precision requirement. Search parameters used during the search of the paper catalog may depend on a level of the customer precision requirement. Responsive to identifying an ICC profile during the search of the paper catalog that satisfies the customer precision requirement and can be used by the printer make and model associated with the original request, the computing device may transmit the ICC profile to the requesting printer via a network. In some instances, the computing device may determine the paper catalog lacks an ICC profile that satisfies the customer precision requirement and transmit an indication that no existing ICC profile is available.

16 Claims, 5 Drawing Sheets

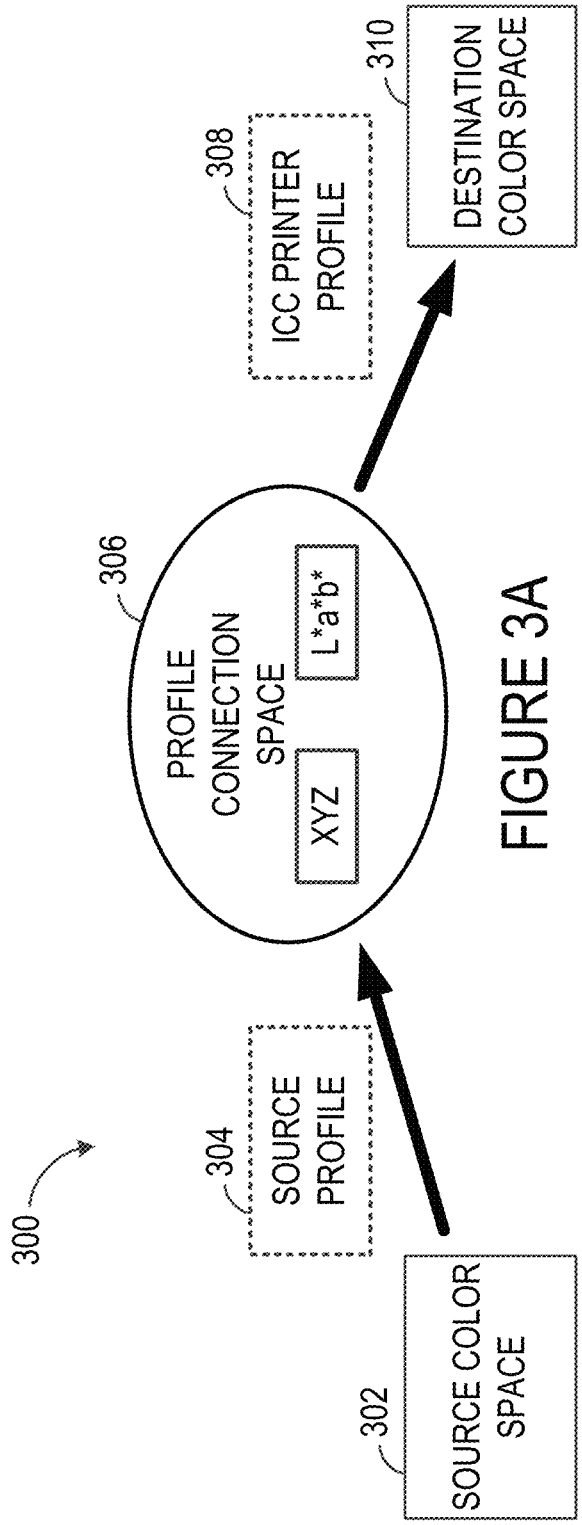
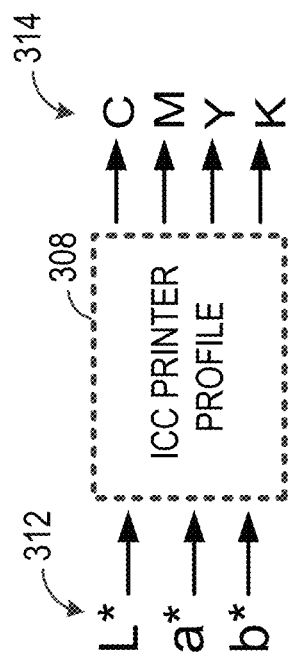
FIGURE 3A
FIGURE 3B

METHODS AND SYSTEMS FOR DYNAMIC SHARING OF ICC PROFILES

BACKGROUND

Color transformation, also referred to herein as color space conversion or color conversion, involves transforming the representation of a color from one color space to another color space. In some implementations, a device-independent intermediary space is used for the conversion between a source color space and a destination color space. To help simplify and standardize color transformations, the International Color Consortium (ICC) developed a set of standards that is used to create ICC profiles that characterize different color spaces. Under the terminology set by the ICC, color conversion typically involves using a source ICC profile to convert the source color space into a profile connection space (PCS) and using a destination ICC profile to derive the destination color space based on input colors from the PCS. The PCS can use either the CIELAB (L*a*b* color space) or the CIEXYZ color space for color conversions.

Some color transforms are governed by well-defined mathematical equations, such as from a red, green, and blue (RGB) color space to a device-independent color space (e.g., the XYZ color space). Other color transforms lack these mathematical equations and instead utilize one or more look up tables (LUTs), which each convey local empirical correspondences that can be used to map one color space to another. For example, to convert from the L*a*b* color space to the CMYK color space, a three-dimensional look up table (3D-LUT) can be used. In the L*a*b* color space, colors are expressed using three components: an L* component, an a* component, and a b* component. Each of these components is represented by an 8-bit integer, which results in 256 total possible values for each component. A complete 3D-LUT for the color conversion would therefore include 256-by-256-by-256 inputs, and a corresponding 4-byte CMYK output for each input. As such, an ICC profile may include one or more well-defined mathematical equations and/or one or more LUTs for use during color conversion between color spaces.

For color printing, an ICC printer profile is used as the destination ICC profile within a typical ICC color conversion workflow that enables color conversion from input colors to CMYK ink combinations that the printer can print. Particularly, the ICC printer profile is used to convert from PCS device-independent colors (e.g., CIE L*a*b*) to CMYK quantities that the printer can replicate within the printing process. Thus, during the creation of an ICC printer profile, standard profile maker software tools are configured to identify CMYK ink combinations that are the best matches for the input PCS colors. The CMYK ink combinations identified by the software are then used within one or more 3D-LUTs stored by the ICC printer profile to enable mapping input L*a*b* quantities from the PCS to output CMYK ink combinations.

The color appearance of printer inks on different types of papers can differ substantially, which can be attributed to various parameters, such as how the ink interacts with the paper, the exact "white" color of the paper that affects human color visual response, the physical appearance of the paper, and the amount of ink the paper can hold. For example, an uncoated sixty pound paper may have a maximum 225% ink limit while a glossy, gelatin-coated one hundred pound card stock may have a 330% ink limit. Thus, to enable accurate color reproduction under ICC color management, each ICC profile typically factors the specific paper type and printing pipeline combination (e.g., all of the color and image processing, half-toning, and physical setting of the printing mechanism, including inks and colorants used). For example, a production printer includes a paper catalog that contains pertinent information of all the paper types that the printer can use. The paper catalog may represent each paper type with a unique identifier (ID) and also express different fields of information for each paper type. The ID may enable a user to understand which paper types have information stored in the paper catalog. Example fields of information may include paper weight (e.g., 65 lb), coating (e.g., matte, glossy, or none), brightness, whiteness, shade, ICC profile, and XYZ white point, among others. Each ICC profile may be made for the paper type and may have a specific white point. The ICC profiles used in production printing may assume viewing in a D50 illuminate, which is a white light used in print shop judgments. In addition, ICC printer profiles specify forward and reverse mappings in the form of LUTs with contents that are not absolute measurements of L*a*b*. Instead, the contents are adjusted with the assumption that the viewer is chromatically adapted to the paper's white point.

Some situations can arise where a printer does not have a paper type in its paper catalog. For example, when a customer selects a new paper type that is not currently in a print shop's paper catalog, a conventional approach may involve setting up the printer to an optimal operating state, gauging the ink limit of the new paper, printing 2,000 patches of CMYK colorant combination, measuring the L*a*b* colorimetric values of the printed patches including paper white and computing the forward and reverse mappings that make up an ICC profile for the paper type. Although the conventional process can create an ICC profile for use with subsequent print jobs, it is time intensive, requires a technician with trained skills, and also relies upon using the printer for creation of the ICC profile, which results in lost printing production time. Further, some ICC profiles may be used on a limited basis making the process not a worthwhile use of time.

SUMMARY

In one example, a system is described. The system includes a printer, a processor, and a non-transitory computer-readable medium having stored therein instructions that are executable to cause the processor to perform various functions. The functions include receiving data representing: (i) a paper type, (ii) a customer precision requirement, and (iii) supporting parameters and responsive to receiving the data, performing a search of a paper catalog using the data for an existing ICC profile that satisfies the customer precision requirement. At least one search parameter used during the search of the paper catalog depends on a level of the customer precision requirement. The functions also include, responsive to identifying a particular ICC profile that satisfies the customer precision requirement during the search of the paper catalog, transmitting the particular ICC profile to the printer via a network. The printer is configured to use the particular ICC profile to complete a print job on the paper type according to the customer precision requirement.

In another example, a method is described. The method involves receiving, at a computing device, data representing: (i) a paper type, (ii) a customer precision requirement, and (iii) supporting parameters. The method also involves, responsive to receiving the data, performing, by the computing device, a search of a paper catalog using the data for an existing ICC profile that satisfies the customer precision requirement. At least one search parameter used during the search of the paper catalog depends on a level of the customer precision requirement. The method also involves, responsive to identifying a particular ICC profile that satisfies the customer precision requirement during the search of the paper catalog, transmitting, by the computing device, the particular ICC profile to a printer via a network. The printer is configured to use the particular ICC profile to complete a print job on the paper type according to the customer precision requirement.

In another example, a non-transitory computer-readable medium is described. The non-transitory computer-readable medium has stored therein instructions that are executable to cause a system to perform the functions of the method described above.

The features, functions, and advantages that have been discussed can be achieved independently in various embodiments or may be combined in yet other embodiments further details of which can be seen with reference to the following description and figures.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying figures, wherein:

FIG. 3A illustrates a color conversion system, according to an example embodiment.

FIG. 3B illustrates an ICC printer profile, according to an example embodiment.

DETAILED DESCRIPTION

Figure 1:
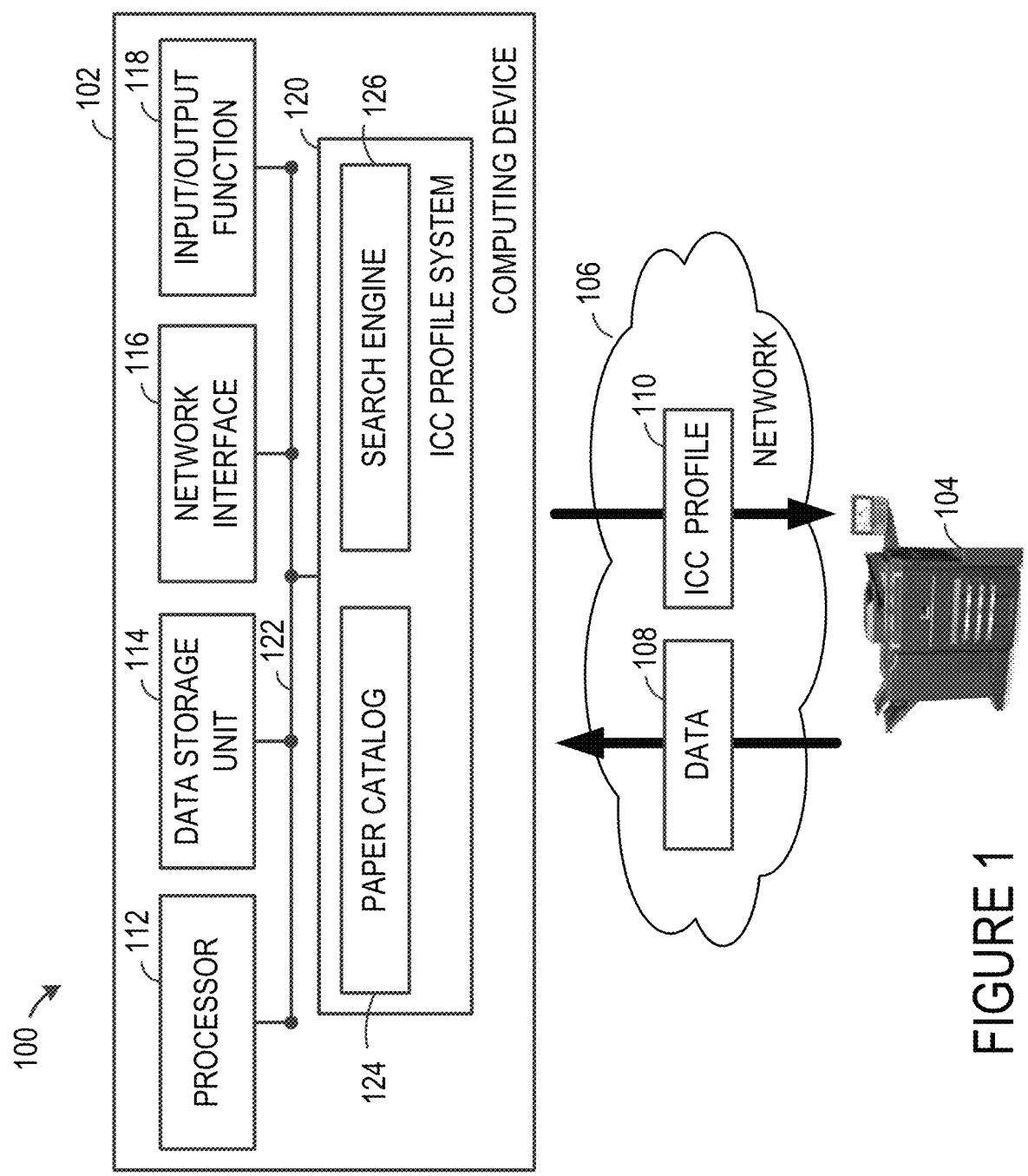
FIG. 1 conceptually illustrates a system for dynamic sharing of ICC profiles, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations. Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

As discussed above, existing ICC profile maker software typically requires substantial inputs (e.g., measurements from thousands of printed color patches), time, and resources to create an ICC printer profile that accommodates a print job that involves a new paper type for a particular type of printer (e.g., a production printer model). For example, generating an ICC profile typically requires using a colorimeter or a spectrophotometer to measure thousands of printed patches to develop the mapping from a color space to the PCS, and from the PCS to the color space. Overall, creating a new ICC profile for a model of printer is usually a laborious process.

Example embodiments presented herein describe techniques and systems that enable the dynamic sharing of ICC profiles. Particularly, example embodiments can enable printers to access existing ICC profiles to complete print jobs on various types of paper, which can save time and resources by avoiding the creation of new ICC profiles using the laborious ICC creation process described above. For example, when a printer's local paper catalog lacks an ICC profile that is suitable for a customer's print job on a particular paper type being used by a given model of printer, the printer (or another computing device) may query the dynamic ICC profile sharing system to check if the sharing system has an ICC profile suitable for completing the print job. In response to the query, the dynamic ICC profile sharing system may scan one or more cloud-based paper catalogs to check if an existing ICC profile is available to accommodate the customer's print job on the model of printer being used. Particularly, the system may perform a search of the paper catalog(s) for an ICC profile that can satisfy the level of precision associated with the customer's print job given the paper type and printer model being used. The precision requirement may indicate how accurately the print job should reflect the input colors.

In some cases, the dynamic ICC profile system may identify one or more existing ICC profiles while searching the paper catalog that can be used by the particular printer to complete the customer's print job according to expectations (e.g., meet the customer's precision requirement) and subsequently transmit the ICC profile most suitable for the print job to the printer over a network for use by the printer. Upon receiving the ICC profile, the printer may complete the print job using the ICC profile received from the dynamic sharing system. In some instances, the printer may store the ICC profile in local memory for subsequent use. This way, the printer can access the ICC profile to complete other print jobs when suitable.

In other cases, however, the dynamic sharing system may determine that the paper catalog(s) lack an existing ICC profile that could be used by the particular printer make and model to complete the customer's print job. Particularly, the search may reveal that no ICC profile is available for the paper type and printer make and model that satisfies the customer's precision expectation. In such a scenario, the dynamic sharing system may provide an indication to the printer that no ICC profile exists for the printer type that can accommodate the customer's print job using the paper type. In some instances, the indication may signal that a new ICC profile may be needed in order to complete the print job using that particular model and make of printer. As such, the indication can cause the customer to adjust the precision expectation in order to submit another request for an ICC profile that can accommodate the print job with a different precision expectation. For instance, the customer may submit a lower precision expectation after learning that the cloud-based paper catalog(s) lack an existing ICC profile to complete the print job according to the original precision expectation. The dynamic sharing system may perform an additional search of the paper catalog(s) for an ICC profile that the printer make and model can use on the given paper type and satisfy the customer's lower precision requirement when completing the print job.

As shown, a dynamic ICC profile sharing system can share ICC profiles with various printers over network connections, which can ultimately save time and resources when compared to the large amounts of color measurements needed to generate a new ICC profile. The sharing system can facilitate the sharing of ICC profiles between various computing devices and printers. Within embodiments, the sharing system may involve transferring ICC profiles between printers, servers, computing devices, and various types of memory. The system may store and potentially organize ICC profiles for access by external devices (e.g., printers). In some instances, the system may store and organize ICC profiles according to one or more parameters, such as paper type, printer type (e.g., make and model), and/or color space, etc.

To further illustrate, a computing device associated with the dynamic ICC profile sharing system may receive data representing a paper type, a customer precision requirement, and supporting parameters and responsively use the data to perform a search of a paper catalog for an existing ICC profile that satisfies the customer precision requirement. The search parameters used during the search of the paper catalog can depend on a level of the customer precision requirement, the printer make and model, the paper type, and/or other elements of the print job. In some cases, the computing device may identify an existing ICC profile that can be used by the printer model, works with the particular paper type, and satisfies the customer precision requirement and subsequently transmit the identified ICC profile to the printer via a network (e.g., the Internet). After receiving the ICC profile, the printer can complete the print job using the ICC profile. In some instances, the printer may also store the ICC profile locally in memory at the printer for subsequent access and potential use.

In other cases, the computing device may fail to identify an existing ICC profile that can be used by the printer model for the paper type and satisfy the customer precision requirement. In such a situation, the computing device may transmit an indication to the printer (or corresponding computing device) that indicates the paper catalog does not include an existing ICC profile for that printer model that can complete the printer job at a precision level that satisfies the customer precision requirement. In response, the customer may choose to adjust the expected precision requirement, which can result in another search for an ICC profile that can be used by the printer model to complete the print job using the paper type at a precision level that meets the adjusted precision requirement. In some instances, the customer may not adjust the precision requirement, which may require a new ICC profile to be generated by a technician after the dynamic sharing system failed to identify a suitable existing ICC profile. Various other features of the example method discussed above, as well as other methods and systems, are described hereinafter with reference to the accompanying figures.

Referring now to the figures, FIG. 1 is a conceptual illustration of a system 100 for dynamic sharing of ICC profiles. In line with the discussion above, the system 100 may enable dynamic sharing of ICC profiles for print jobs on various paper types by various types of printers (e.g., production printers). In the embodiment shown in FIG. 1, the system 100 includes a computing device 102 in communication with a printer 104 via a network 106. In other embodiments, the system 100 may include more or fewer components.

The computing device 102 could be any type of computing device, such as a mobile phone, tablet computer, wearable computer, desktop computer, laptop computer, etc. In some embodiments, the computing device 102 may operate as a part of the printer 104 or another printer not shown in FIG. 1. In some embodiments, the computing device 102 may correspond to a server that can provide existing ICC profiles stored via the paper catalog 124 to various types of printers over the network 106.

As further shown in FIG. 1, the computing device 102 includes a processor 112, data storage 114, network interface 116, input/output function 118, and an ICC profile system (IPS) 120, all of which may be coupled by a system bus 122 or a similar mechanism. It should be understood that the examples of a computing device are provided for illustrative purposes. Further, in addition to and/or alternatively to the examples above, other combinations and/or sub combinations of a printer, computer, and server may also exist, amongst other possibilities, without departing from the scope of the embodiments herein.

The processor 112 may include one or more central processing units (CPUs), such as one or more general purpose processors and/or one or more dedicated processors (e.g., application specific integrated circuits also known as ASICs or digital signal processors also known as DSPs, etc.).

Data storage 114, in turn, may comprise volatile and/or non-volatile data storage and can be integrated in whole or in part with processor 112. Data storage 114 may store program instructions, executable by processor 112, and data that are manipulated by these instructions to carry out the various methods, processes, or functions described herein. Alternatively, these methods, processes, or functions can be defined by hardware, firmware, and/or any combination of hardware, firmware and software. Therefore, data storage 114 may include a tangible, non-transitory computer-readable medium, having stored thereon program instructions that, upon execution by one or more processors, cause computing device 102 to carry out any of the methods, processes, or functions disclosed in this specification or the accompanying drawings. In some embodiments, data storage 114 may be used to store ICC profiles.

Network interface 116 may take the form of a wire line connection, such as an Ethernet, Token Ring, or T-carrier connection. Network interface 116 may alternatively take the form of a wireless connection, such as WiFi, BLUETOOTH®, or a wide-area wireless connection. However, other forms of physical layer connections and other types of standard or proprietary communication protocols may be used over network interface 116. Furthermore, network interface 116 may comprise multiple physical communication interfaces. In addition, network interface 116 may enable computing device 102 and components within computing device 102 to communicate with external sources via network 106.

Input/output function 118 may facilitate user interaction with the computing device 102. Input/output function 118 may comprise multiple types of input devices, such as a keyboard, a mouse, a touch screen (e.g., a graphical user interface (GUI)), a microphone and/or any other device that is capable of receiving input from a user. Similarly, input/output function 118 may comprise multiple types of output devices, such as a display, printer, one or more light emitting diodes (LEDs), speaker, or any other device that is capable of providing output discernible to a user. Additionally or alternatively, example computing device 102 may support remote access from another device, via network interface 116 or via another interface (not shown), such as an RS-132 or Universal Serial Bus (USB) port.

The IPS 120 represents a system that can perform processes related to ICC profile management, including storage, organization, search, and distribution of ICC profiles. As shown in FIG. 1, the IPS 120 includes a paper catalog 124 configured to organize and store existing ICC profiles and a search engine 126 configured to search the paper catalog 124 using search parameters that help identify a particular ICC profile suitable for a particular print job. Thus, the search parameters used for each search may depend on parameters associated with a print job, such as the paper type, the printer make and model, the precision expectation for the print job, and other supporting parameters. In some examples, the IPS 120 may include multiple paper catalogs used to store existing ICC profiles. For instance, one paper catalog may include ICC profiles for a first type of printer and another paper catalog may include ICC profiles for a different type of printer.

The IPS 120 may enable the computing device 102 to receive data from printers and responsively search for an existing ICC profile that meets the needs of a particular print job (or an indication that no existing ICC profile is available). To illustrate, FIG. 1 shows the printer 104 transmitting data 108 to the computing device 102 via the network 106. Upon receiving the data 108, the search engine 126 may use the data 108 to identify a suitable ICC profile from the paper catalog 124 that can be used to complete the print job at the printer 104 according to the expectations associated with the print job (e.g., meet the color reproduction precision requirement). As such, the data 108 may include, for example, paper type, printer make and model, customer precision requirement, and supporting parameters. The supporting parameters required for executing an accurate search can depend on the level of the customer's precision requirement. In particular, a higher precision requirement may require more information within the data 108 to enable an accurate search for a suitable ICC profile.

In some examples, the IPS 120 may identify a suitable existing ICC profile usable by the printer 104 and subsequently transmit the ICC profile 110 to the printer 104. The printer 104 may then use the ICC profile 110 to complete the print job. In other examples, the IPS 120 may determine that the paper categorization system lacks a suitable ICC profile that the printer 104 can use for the print job on the paper type according to the expectations provided within the data 108. For example, the paper type may be new or the type of printer may have not had an ICC profile generated for the paper type previously. In addition, there might not be an ICC profile that satisfies the customer precision requirement associated with the print job for the printer being used to complete the print job. As such, the IPS 120 may indicate that the production of a new ICC profile may be needed.

As indicated above, the searching process executed by the search engine 126 may use different search parameters depending on aspects of the print job. As an example, when the print job has a low precision expectation, the search engine 126 may conduct the search of the paper catalog 124 without any measurements from color printing of the printer 104. Rather, the search engine 126 may use the new paper type's whiteness and shade to act as a CIE XYZ white point substitute, which can be used to search for similar entries in the paper catalog 124. The search engine 126 can also use an estimated ink limit derived from the new paper's weight and coating to search for similar entries in the paper catalog 124. The search may result in the IPS 120 identifying an ICC profile with the paper's white point substitute and assumed ink limit, if one is available.

In another example, the IPS 120 may receive an indication within the data 108 that the print job has an associated moderate precision expectation. In such a situation, the IPS 120 may require additional parameters to identify an ICC profile that can be used to complete the print job according to the moderate precision expectation. As such, the IPS 120 may transmit a request for the additional parameters. To comply, the printer 104 can be used to print a small set of heavily inked patches with patches at different total ink percentages. These can be then judged for negative effects, such as paper damage, deformation, and wetness issues. As such, these patches can be measured to capture instances of over-inked saturated paper and also paper white information. The ink judgment percentages and data can be included within the data 108 sent to the computing device 102, which then can be used by the search engine 126 to identify an ICC profile with the paper's white point and approximate ink limit (if one is available) for the printer 104 to use.

In yet another example, the IPS 120 may receive an indication within the data 108 that the print job has an associated high precision expectation. In such a situation, the IPS 120 may request for additional information from the printer 104. Particularly, the printer 104 can be used to print a small set of heavily inked patches (at different total ink percentages) along with primary and secondary colors. This can provide additional information regarding how the color inks interact with the paper type that is being used for the print job. As such, similar to the moderate precision expectation, these patches can be measured using one or more color measurement tools. The ink judgement percentages and measurement data can be then provided to the computing device 102, which can be used by the search engine 126 to identify an ICC profile within the paper catalog 124 with the paper's white point, similar primary and secondary color behavior, and approximate ink limit, if such an ICC profile is available.

Figure 2:
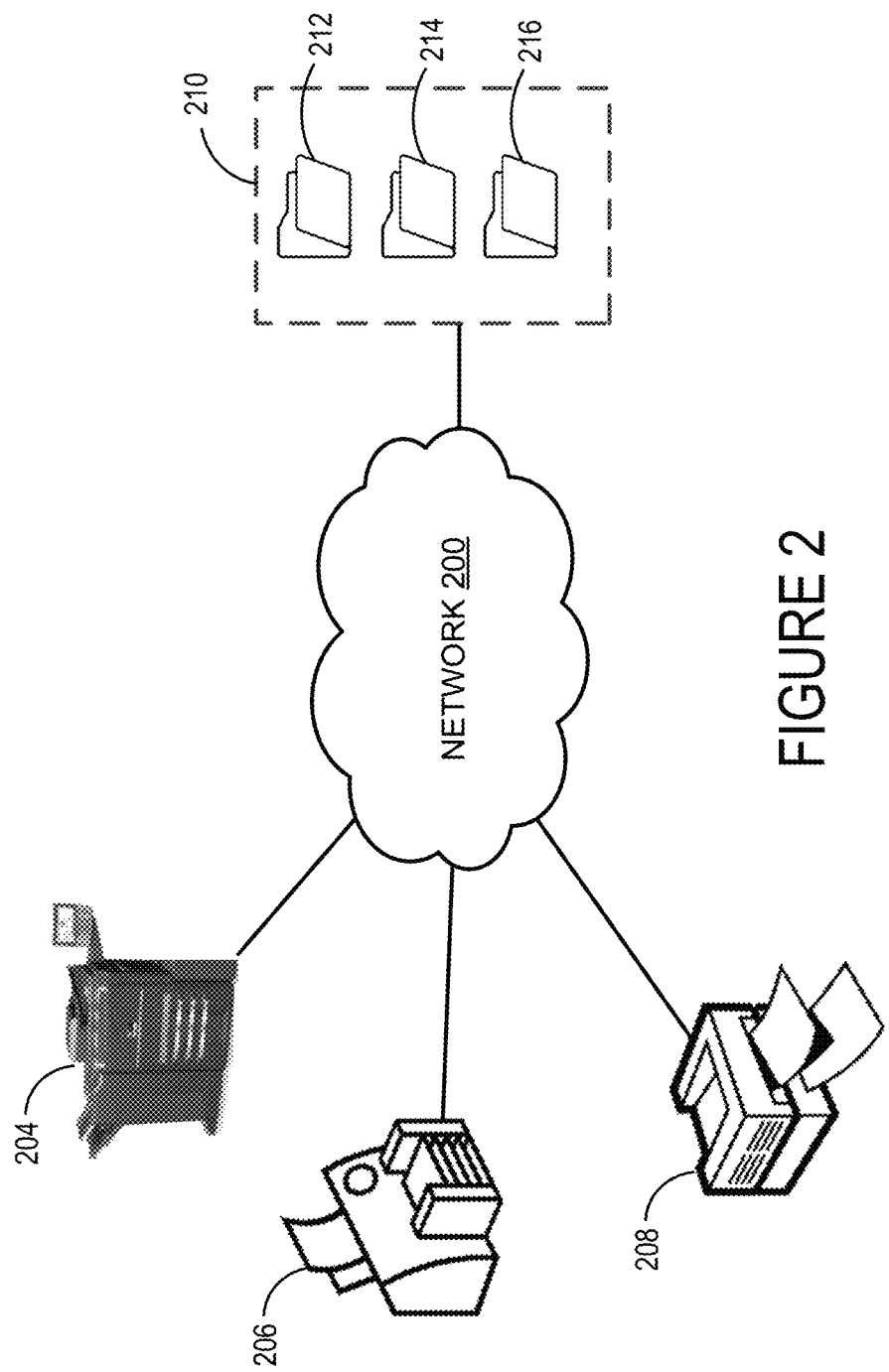
FIG. 2 is a diagram illustrating a network for dynamically sharing ICC profiles, according to an example embodiment.

FIG. 2 is a diagram illustrating network 200, in accordance with an example embodiment. The network 200 may be implemented as the network 106 shown in FIG. 1. As shown, the network 200 may facilitate secure wireless communication between printers 204, 206, 208, and ICC profile system (IPS) 210. As such, the network 200 may represent any type of wireless communication network, such as the Internet.

The printing devices 204, 206, 208 can include components configured to perform one or more operations, such as scan, print, copy, e-mail, account for, communicate and/or otherwise process documents and/or files that are originally available either on paper or electronically. In some embodiments, the printing devices 204-208 can perform other tasks and/or other processing as well. As such, the printing devices 204-208 can include products from various manufacturers with variations in color, speed, computing power, functionality, network connectivity, and/or other features.

In some examples, some or all of printing devices 204-208 can be connected to network 200 through one or more, possibly different, network protocols. Data can be transmitted between the printing devices 204-208 and the IPS 210 via network 200. The format of each respective data transmission between devices in network 200 can include one or more of a variety of different formats including: text formats, image formats, extensible mark-up language (XML), Simple Network Maintenance Protocol (SNMP) formats, database tables.

In some embodiments, one or more additional computing devices, e.g., one or more servers, nodes, and/or other computing devices, can be used in the network 200 to perform additional functions, such as functions for one or more document solutions and managed print services, prediction-related functions, act as databases, and provide machine learning functionality, among other functions.

The IPS 210 represents an ICC profile sharing system, which may be executed by one or more computing devices (e.g., one or more servers). For example, the IPS 210 may be implemented as the IPS 120 that is part of the computing device 102 illustrated in FIG. 1.

In some examples, the IPS 210 may organize ICC profiles into different paper catalogs 212, 214, 216. The contents (e.g., the ICC profiles) stored within each paper catalog 212-216 can vary based on various parameters, such as paper type, color parameters, customer precision levels, printer make and model, or a combination thereof. In one embodiment, paper catalog 212 may include ICC profiles generated for printer make and model represented by the printer 204, paper catalog 214 may include ICC profiles generated for printer make and models represented by the printer 206, and paper catalog 216 may include ICC profiles generated for printer make and models represented by the printer 208. In other embodiments, the IPS 210 may include a single paper catalog arranged to store all existing ICC profiles. As such, the IPS 210 may be configured to search for existing ICC profiles and dynamically sharing ICC profiles with printers 204-206 to complete print jobs when a suitable ICC profile is available to meet the expectations of a print job (e.g., color precision accuracy) for a given printer type. This can save time and resources avoiding the creation of new ICC profiles in some situations.

FIG. 3A illustrates a color conversion system, according to an example embodiment. The system 300 represents a managed color workflow that offers color consistency and predictability during color conversion. As shown in FIG. 3A, the system 300 includes a source color space 302, a source ICC profile 304, a profile connection space (PCS) 306, an ICC printer profile 308, and a destination color space 310.

The system 300 may be used for color conversion from a source color space 302 (e.g., colors associated with a print job) to destination color space 310 (e.g., CMYK ink combinations that a particular printer model can print). As such, the system 300 may involve initially obtaining the source color space 302, which may represent colors used by a source device (e.g., a computer monitor, a scanner). Some examples of the source color space can include an RGB color space, a CMYK color space, and a CMYKOGV color space.

The system 300 further involves identifying a source ICC profile 304 that corresponds to the source color space 302. The source ICC profile 304 may provide a mapping for colors within the source color space 302 to the PCS 306. For example, the source ICC profile 304 may store one or more LUTs that can be used to map source color space 302 to the L*a*b* color space or to the XYZ color space for the PCS 306. Alternatively, the source ICC profile 304 can include one or more equations for mapping the source color space 302 to the L*a*b* color space or to the XYZ color space for the PCS 306.

The PCS 306 can serve as the interface which provides an unambiguous connection between input profiles (e.g., the source ICC profile 304) and output profiles (e.g., the ICC printer profile 308) within the system 300. The PCS 306 can allow the profile transforms for input, display, and output devices to be decoupled so that they can be produced independently. As such, the PCS 306 can serve as the virtual destination for input transforms and the virtual source for output transforms. When the input and output transforms are based on the same PCS definition, even though they are created independently, the input and output transforms can be paired arbitrarily at run time by a color-management module (CMM) and will yield consistent and predictable results when applied to color values.

The ICC printer profile 308 may enable mapping colors from the PCS 306 to the destination color space 310. In particular, the ICC printer profile 308 may provide a mapping for colors within the PCS 306 to the destination color space 310. For example, the ICC printer profile 308 may store one or more LUTs that can be used to map input colors from the PCS 306 (e.g., L*a*b* color space) to the CMYK color space associated with the destination color space 310. Alternatively, the ICC printer profile 308 can include one or more equations for mapping colors from the PCS 306 to the destination color space 310. In some embodiments, the ICC printer profile 308 depends on the make and model printer performing the print job.

FIG. 3B illustrates inputs and outputs for the ICC printer profile 308, according to one or more example embodiments. As shown, the ICC printer profile 308 may represent a destination ICC profile configured to enable a particular printer make and model to map input L*a*b* values 312 obtained from the PCS 306 shown in FIG. 3A to output CMYK values 314 used to complete the print job. For instance, the ICC printer profile 308 can store one or more LUTs, such as a LUT for mapping colors from the L*a*b* color space to the destination color space 310.

Figure 4:
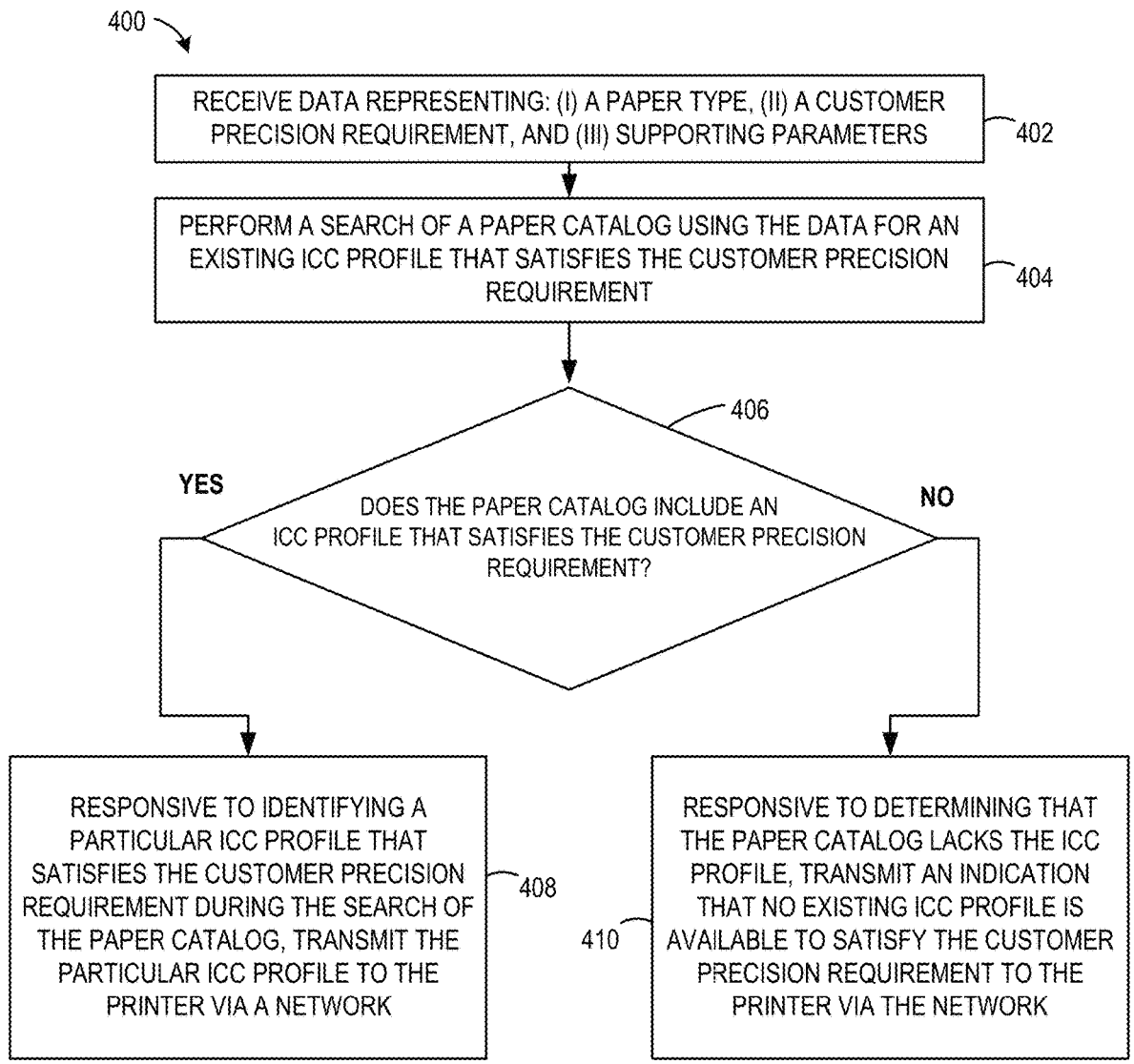
FIG. 4 shows a flowchart for a method for dynamic sharing of ICC profiles, according to an example embodiment.

FIG. 4 shows a flowchart of an example method 400, according to an example embodiment. Method 400 shown in FIG. 4 presents an embodiment of a method that, for example, could be used with the system shown in FIG. 1, for example, or any of the systems disclosed herein. For example, method 400 could be carried out by computing system 102 shown in FIG. 1 and/or could be carried out by other types of devices or device subsystems.

Method 400 may include one or more operations, functions, or actions as illustrated by one or more of blocks 402-410. Although these blocks are illustrated in a sequential order, these blocks may also be performed in parallel, and/or in a different other than those described herein. Also, the various blocks may be combined into fewer blocks, divided into additional blocks, and/or removed based upon the desired implementation.

Initially, at block 402, the method 400 involves receiving, at a computing device, data representing: (i) a paper type, (ii) a customer precision requirement, and (iii) supporting parameters. For example, the computing device may receive the data from a printer via a network (e.g., the Internet). In some instances, the computing device may receive an input that requests for an ICC profile to complete a print job using the paper type from an interface corresponding to the printer. As such, the computing device can also obtain an indication of the printer type, such as the make and model that will be used to perform the print job.

The supporting parameters obtained by the computing device may depend on the customer precision requirement. In some examples, the supporting parameters may include a small set of color measurements. As such, the computing device may be configured to request for particular supporting parameters responsive to determining the customer precision requirement.

At block 404, the method 400 involves, responsive to receiving the data, performing a search of a paper catalog using the data for an existing ICC profile that satisfies the customer precision requirement. In particular, at least one search parameter used during the search of the paper catalog depends on a level of the customer precision requirement.

In some embodiments, the computing device may determine the level of the customer precision requirement responsive to receiving the data. For instance, the computing device may determine that the customer precision requirement is high, medium, low. In some embodiments, the computing device may use precision thresholds to differentiate from high, medium, and low levels. The computing device may further determine one or more search parameters for use during the search based on the level of the customer precision requirement.

At block 406, the method 400 involves determining whether the paper catalog includes an ICC profile that satisfies the customer precision requirement. When the computing device determines that the paper catalog includes an ICC profile that can be used by the printer requesting the ICC profile to complete the print job at a level that satisfies the customer precision requirement, the method 400 proceeds to block 408. At block 408, the method 400 involves, responsive to identifying a particular ICC profile that satisfies the customer precision requirement during the search of the paper catalog, transmitting the particular ICC profile to a printer via a network. The printer is configured to use the particular ICC profile to complete a print job on the paper type according to the customer precision requirement.

In some embodiments, the computing device may determine the customer precision requirement is below a first precision threshold. For instance, the customer precision requirement may be considered as low when below the first precision threshold. When the customer precision is a low precision expectation, no color printing nor measurements may be required. Rather, performing the search may involve using (i) a XYZ white point substitute determined based on a whiteness and a shade corresponding to the paper type and (ii) an ink limit estimated based on a weight and a coating corresponding to the paper type. In particular, the whiteness, the shade, the weight, and the coating may be supporting parameters. For instance, the computing device may use data representing the new paper type's whiteness and shade to act as the XYZ white point substitute and search for similar entries in the paper catalog. The new paper type's weight and coating may be used to estimate an ink limit, which the computing device can use to search for similar entries in the paper catalog. In some instances, the computing device may identify, during the search, an ICC profile based on the XYZ white point substitute and ink limit (if one is available) and responsively provide the ICC profile to the printer.

In some embodiments, the computing device may determine that the customer precision is above the first precision threshold and below a second precision threshold. For instance, the customer precision requirement may be considered as medium when above the first precision threshold and below the second precision threshold. When the customer has a moderate precision expectation (e.g., medium level), the computing device may use different inputs to execute the search for an existing ICC profile that is suitable. This may involve printing a small set of heavily inked patches (at different total ink percentages) using the printer that is seeking the ICC profile and a user judging the patches for negative effects, such as paper damage, deformation, and wetness issues. For instance, the ink patches may be different shades of greys and blacks. The inked patches can be measured using one or more measuring tools, which can capture instances of over-inked saturated paper. The paper white can also be measured for the new paper type. As such, the computing device may receive the ink judgement percentages and measurement data. For instance, the user may transmit this information to the computing device via one or more interfaces, such as an interface corresponding to the printer.

By extension, performing the search may be based on the ink judgment percentages and measurement data received at the computing device. As indicated above, the ink judgment percentages and the measurement data are supporting parameters that can be estimated based on measurements on a set of ink patches having high ink amounts. The high ink amounts may cause one or more ink patches from the set of ink patches to include one or more negative effects. The computing device may identify, during the search, an ICC profile that can be used by the printer based on the ink judgment percentages and measurement data. For example, the computing device may identify an ICC profile with the paper's white point and approximate ink limit that is usable by the printer, if one is available.

In further embodiments, the computing device may determine that the customer precision is above the first precision threshold and the second precision threshold, which may indicate that the customer precision is high. With a higher precision expectation from the customer, the computing device may perform the search for an existing ICC profile differently to accommodate the higher precision. Similar to the moderate level of precision discussed above, the computing device may utilize measurements obtained based on a small set of heavily inked patches. For the higher precision, the printer seeking the ICC profile (or a matching printer having the same make and model) may print a small set of heavily inked patches (at different total ink percentages) along with primary and secondary colors. A user may measure these patches and the white of the paper type and subsequently provide the ink judgment percentages and measurement data to the computing device.

As such, based on determining the customer precision requirement is above the first precision threshold and the second precision threshold, the computing device may perform the search of the paper catalog based on ink judgment percentages and measurement data where the ink judgment percentages and measurement data are supporting parameters estimated based on measurements on a set of ink patches having primary and secondary colors. As such, the computing system may identify, during the search, a particular ICC profile based on the ink judgment percentages and measurement data. For example, the particular ICC profile may accommodate the new paper type's white point, primary and secondary color behavior, and approximate ink limit. In some cases, the paper catalog might not include an ICC profile that is suitable for all the parameters described above.

Returning back to block 406, when the computing device determines that the paper catalog lacks an ICC profile that can be used by the requesting printer to perform the print job at a level that satisfies the customer precision requirement, the method 400 proceeds to block 410. At block 410, the method 400 involves, responsive to determining that the paper catalog lacks the ICC profile, transmitting an indication that no existing ICC profile is available to satisfy the customer precision requirement to the printer via the network. Providing an indication may alert that a new ICC profile may need to be created to complete the print job.

In some examples, the method 400 may further involve receiving additional data indicating a second customer precision requirement. In particular, the second customer precision requirement is different from the original customer precision requirement. The customer may adjust the precision expectation in response to learning that an existing ICC profile is not available for the printer to use to complete the print job according to the original precision expectation. As such, responsive to receiving the additional data, the computing device may perform a second search of the paper catalog using the additional data for an existing ICC profile that satisfies the second customer precision requirement. In some instances, the computing device may transmit the given ICC profile to the printer via the network responsive to identifying a given ICC profile that satisfies the second customer precision requirement during the second search of the paper catalog. The printer may be configured to use the given ICC profile to complete the print job on the paper type according to the second customer precision requirement.

Figure 5:
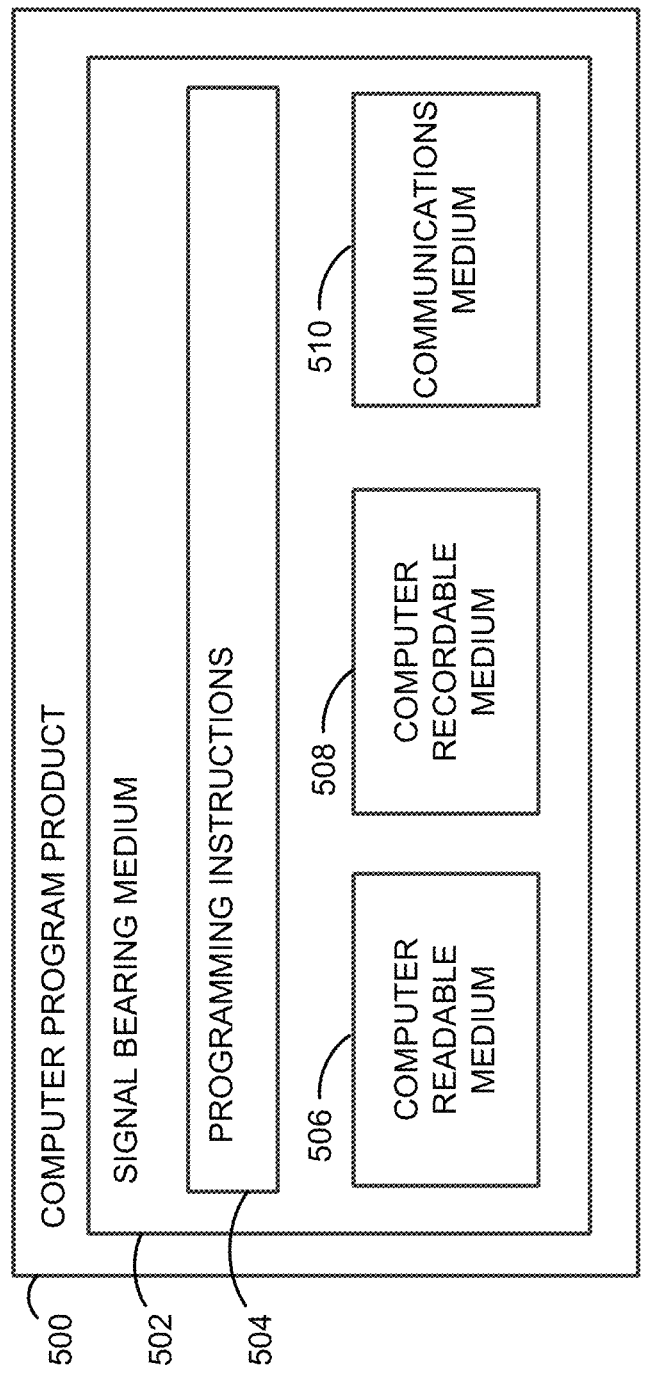
FIG. 5 illustrates a schematic diagram of a computer program, according to example embodiments.

FIG. 5 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 500 is provided using signal bearing medium 502, which may include one or more programming instructions 504 that, when executed by one or more processors may provide functionality or portions of the functionality described above with respect to FIGS. 1-4. In some examples, the signal bearing medium 502 may encompass a non-transitory computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computing device 102 of FIG. 1 may be configured to provide various operations, functions, or actions in response to the programming instructions 504 conveyed to the computing device 102 by one or more of the computer readable medium 506, the computer recordable medium 508, and/or the communications medium 510.

The non-transitory computer readable medium could also be distributed among multiple data storage elements, which could be remotely located from each other. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The invention claimed is:
1. A system comprising:
a printer;
a processor; and
a non-transitory computer-readable medium having stored therein instructions that are executable to cause the system to perform functions comprising:
receiving data representing: (i) a paper type, (ii) a customer precision requirement, and (iii) supporting parameters;
responsive to receiving the data, performing a search of a paper catalog using the data for an existing ICC profile that satisfies the customer precision requirement, wherein at least one search parameter used during the search of the paper catalog depends on a level of the customer precision requirement;
responsive to identifying a particular ICC profile that satisfies the customer precision requirement during the search of the paper catalog, transmitting the particular ICC profile to the printer via a network, wherein the printer is configured to use the particular ICC profile to complete a print job on the paper type according to the customer precision requirement;
based on performing the search, determining that the paper catalog lacks an ICC profile that satisfies the customer precision requirement,
responsive to determining that the paper catalog lacks the ICC profile, transmitting an indication that no existing ICC profile is available to satisfy the customer precision requirement;
receiving additional data indicating a second customer precision requirement, wherein the second customer precision requirement is different from the customer precision requirement;
responsive to receiving the additional data, performing a second search of the paper catalog using the additional data for an existing ICC profile that satisfies the second customer precision requirement; and responsive to identifying a given ICC profile that satisfies the second customer precision requirement during the second search of the paper catalog, transmitting the given ICC profile to the printer via the network, wherein the printer is configured to use the given ICC profile to complete the print job on the paper type according to the second customer precision requirement.

2. The system of claim 1, wherein the functions further comprise:

receiving, from an interface corresponding to the printer, an input that requests for an ICC profile to complete the print job using the paper type; and based on the input, transmitting a request for the data.

3. The system of claim 1, wherein the functions further comprise:

responsive to receiving the data, determining the level of the customer precision requirement; and determining one or more search parameters for use during the search based on the level of the customer precision requirement.

4. The system of claim 3, wherein determining the level of the customer precision requirement comprises:

determining the customer precision requirement is below a first precision threshold; and wherein performing the search of the paper catalog using the data for the existing ICC profile that satisfies the customer precision requirement comprises:

based on determining the customer precision requirement is below the first precision threshold, performing the search using: (i) a XYZ white point substitute determined based on a whiteness and a shade corresponding to the paper type and (ii) an ink limit estimated based on a weight and a coating corresponding to the paper type, wherein the whiteness, the shade, the weight, and the coating are supporting parameters.

5. The system of claim 4, wherein the functions further comprise:

identifying, during the search, the particular ICC profile based on the XYZ white point substitute and the ink limit.

6. The system of claim 3, wherein determining the level of the customer precision requirement comprises:

determining the customer precision requirement is above a first precision threshold and below a second precision threshold; and wherein performing the search of the paper catalog using the data for the existing ICC profile that satisfies the customer precision requirement comprises:

based on determining the customer precision requirement is above the first precision threshold and below the second precision threshold, performing the search of the paper catalog based on ink judgment percentages and measurement data, wherein the ink judgment percentages and measurement data are supporting parameters estimated based on measurements on a set of ink patches having high ink amounts, wherein the high ink amounts cause one or more ink patches from the set of ink patches to include one or more negative effects.

7. The system of claim 6, wherein the functions further comprise:

identifying, during the search, the particular ICC profile based on the ink judgment percentages and measurement data.

8. The system of claim 3, wherein determining the level of the customer precision requirement comprises:

determining the customer precision requirement is above a first precision threshold and a second precision threshold; and wherein performing the search of the paper catalog using the data for the existing ICC profile that satisfies the customer precision requirement comprises:

based on determining the customer precision requirement is above the first precision threshold and the second precision threshold, performing the search of the paper catalog based on ink judgment percentages and measurement data, wherein the ink judgment percentages and measurement data are supporting parameters estimated based on measurements on a set of ink patches that include a plurality of primary and secondary colors.

9. The system of claim 8, wherein the functions further comprise:

identifying, during the search, the particular ICC profile based on the ink judgment percentages and measurement data and the plurality of primary and secondary colors.

10. A method comprising:

receiving, at a computing device, data representing: (i) a paper type, (ii) a customer precision requirement, and (iii) supporting parameters;

responsive to receiving the data, performing, by the computing device, a search of a paper catalog using the data for an existing ICC profile that satisfies the customer precision requirement, wherein at least one search parameter used during the search of the paper catalog depends on a level of the customer precision requirement;

responsive to identifying a particular ICC profile that satisfies the customer precision requirement during the search of the paper catalog, transmitting, by the computing device, the particular ICC profile to a printer via a network, wherein the printer is configured to use the particular ICC profile to complete a print job on the paper type according to the customer precision requirement;

based on performing the search, determining that the paper catalog lacks an ICC profile that satisfies the customer precision requirement;

responsive to determining that the paper catalog lacks the ICC profile, transmitting an indication that no existing ICC profile is available to satisfy the customer precision requirement to the printer via the network;

receiving additional data indicating a second customer precision requirement, wherein the second customer precision requirement is different from the customer precision requirement;

responsive to receiving the additional data, performing a second search of the paper catalog using the additional data for an existing ICC profile that satisfies the second customer precision requirement; and responsive to identifying a given ICC profile that satisfies the second customer precision requirement during the second search of the paper catalog, transmitting the given ICC profile to the printer via the network, wherein the printer is configured to use the given ICC profile to complete the print job on the paper type according to the second customer precision requirement.

11. The method of claim 10, wherein receiving data representing: (i) the paper type, (ii) the customer precision requirement, and (iii) supporting parameters comprises:
receiving the data from the printer via the network.

12. The method of claim 10, further comprising:
responsive to receiving the data, determining the level of the customer precision requirement; and
determining one or more search parameters for use during the search based on the level of the customer precision requirement.

13. The method of claim 12, wherein determining the level of the customer precision requirement comprises:
determining the customer precision requirement is below a first precision threshold; and
wherein performing the search of the paper catalog using the data for the existing ICC profile that satisfies the customer precision requirement comprises:
based on determining the customer precision requirement is below the first precision threshold, performing the search using: (i) a XYZ white point substitute determined based on a whiteness and a shade corresponding to the paper type and (ii) an ink limit estimated based on a weight and a coating corresponding to the paper type,
wherein the whiteness, the shade, the weight, and the coating are supporting parameters.

14. The method of claim 12, wherein determining the level of the customer precision requirement comprises:
determining the customer precision requirement is above a first precision threshold and below a second precision threshold; and
wherein performing the search of the paper catalog using the data for the existing ICC profile that satisfies the customer precision requirement comprises:
based on determining the customer precision requirement is above the first precision threshold and below the second precision threshold, performing the search of the paper catalog based on ink judgment percentages and measurement data, wherein the ink judgment percentages and measurement data are supporting parameters estimated based on measurements on a set of ink patches having high ink amounts, wherein the high ink amounts cause one or more ink patches from the set of ink patches to include one or more negative effects.

15. The method of claim 12, wherein determining the level of the customer precision requirement comprises:
determining the customer precision requirement is above a first precision threshold and a second precision threshold; and
wherein performing the search of the paper catalog using the data for the existing ICC profile that satisfies the customer precision requirement comprises:
based on determining the customer precision requirement is above the first precision threshold and the second precision threshold, performing the search of the paper catalog based on ink judgment percentages and measurement data, wherein the ink judgment percentages and measurement data are supporting parameters estimated based on measurements on a set of ink patches having primary and secondary colors.

16. A non-transitory computer-readable medium having stored therein instructions that are executable to cause a computing system to perform functions comprising:
receiving data representing: (i) a paper type, (ii) a customer precision requirement, and (iii) supporting parameters;
responsive to receiving the data, performing a search of a paper catalog using the data for an existing ICC profile that satisfies the customer precision requirement, wherein at least one search parameter used during the search of the paper catalog depends on a level of the customer precision requirement;
responsive to identifying a particular ICC profile that satisfies the customer precision requirement during the search of the paper catalog, transmitting the particular ICC profile to a printer via a network, wherein the printer is configured to use the particular ICC profile to complete a print job on the paper type according to the customer precision requirement;
based on performing the search, determining that the paper catalog lacks an ICC profile that satisfies the customer precision requirement;
responsive to determining that the paper catalog lacks the ICC profile, transmitting an indication that no existing ICC profile is available to satisfy the customer precision requirement;
receiving additional data indicating a second customer precision requirement, wherein the second customer precision requirement is different from the customer precision requirement;
responsive to receiving the additional data, performing a second search of the paper catalog using the additional data for an existing ICC profile that satisfies the second customer precision requirement; and
responsive to identifying a given ICC profile that satisfies the second customer precision requirement during the second search of the paper catalog, transmitting the given ICC profile to the printer via the network, wherein the printer is configured to use the given ICC profile to complete the print job on the paper type according to the second customer precision requirement.

* * * * *